A. DECKER.
SPRING EQUIPMENT FOR VEHICLES.
APPLICATION FILED OCT. 22, 1913.

1,088,330.

Patented Feb. 24, 1914.

Witnesses

Inventor
Alexander Decker,
By Wm E. Dye,
Attorney

UNITED STATES PATENT OFFICE.

ALEXANDER DECKER, OF MONTGOMERY, PENNSYLVANIA.

SPRING EQUIPMENT FOR VEHICLES.

1,088,330. Specification of Letters Patent. Patented Feb. 24, 1914.

Application filed October 22, 1913. Serial No. 796,629.

*To all whom it may concern:*

Be it known that I, ALEXANDER DECKER, a citizen of the United States, residing at Montgomery, in the county of Lycoming and State of Pennsylvania, have invented certain new and useful Improvements in Spring Equipment for Vehicles; and I do hereby declare the following to be a full, clear, and exact description of the invention, such as will enable others skilled in the art to which it appertains to make and use the same.

My present invention relates to carriages, wagons and wheeled vehicles generally, to all of which it is adapted for use, but is intended more particularly for use upon automobiles and passenger conveyances.

It has for an object the production of means for absorbing shocks to which vehicles are constantly subjected by inequalities of roadbeds, means for cushioning the seats of such vehicles thereby adding materially to the comfort of their occupants, and means for relieving the entire structure of undue and severe strains to which vehicles, particularly heavy motor cars and trucks, are constantly subjected while in service.

With these and other objects and advantages in view, the present invention will be hereinafter particularly described and pointed out in the claims following.

Figure 1:
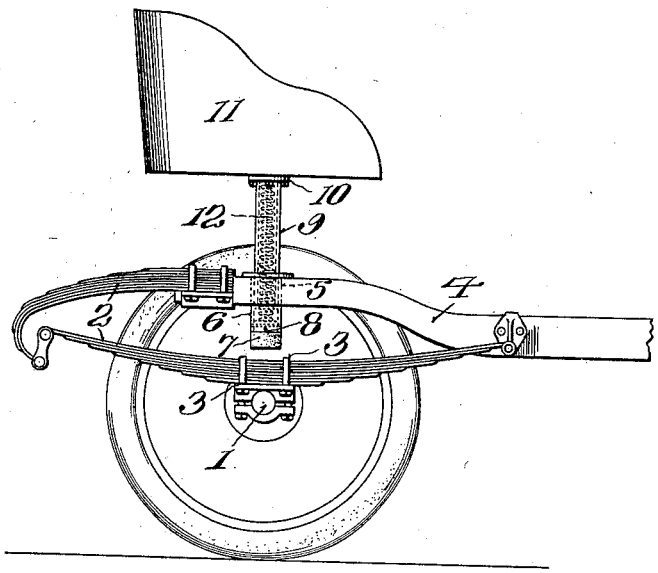
Figure 2:
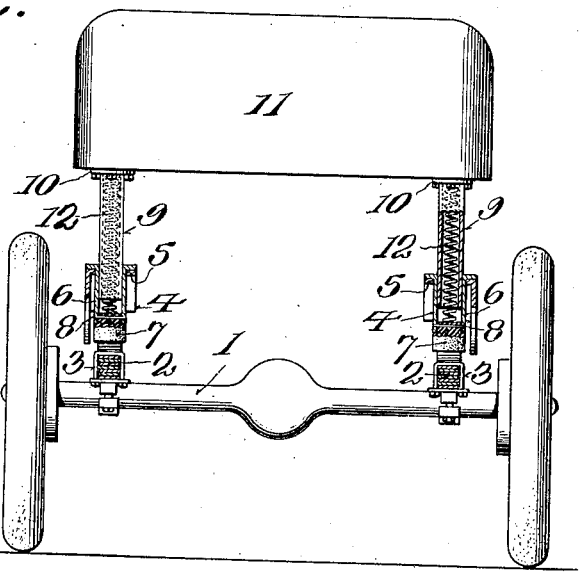

In the accompanying drawings which form part of this application for Letters Patent, and whereon corresponding numerals indicate like parts in both views: Figure 1 is a side elevation of the spring equipment for the driving wheels of a motor vehicle, a seat being here shown diagrammatically, and so much of the running gear as is necessary to illustrate the proper relation of coöperating parts, and Fig. 2 is a rear elevation of parts shown by Fig. 1.

Reference being had to the drawings and numerals thereon, 1 indicates the vehicle axle to which are secured body springs 2 of any approved construction, by agency of the usual clips 3. Secured to the springs 2 in any well known manner is a portion of the rigid vehicle frame 4 which also may be of any approved construction and material, but which, in the present drawings is illustrated as a drop frame of angular cross section.

Through the horizontal portion of frame members 4, in vertical alinement with axle 1, are apertures 5, 5, through which project vertically movable flanged thimbles 6, 6, closed at their lower ends by elastic cushions or buffers 7, 7, preferably of rubber, held in place by any suitable means such as through-pins 8, 8.

Resting loosely and telescopically within the thimbles 6, 6 aforesaid are tubular standards 9, 9, equipped at their upper ends with flanged caps 10, 10 which in turn are securely bolted to the vehicle seat 11. While interposed between both of said caps 10, 10 and their respective buffers 7, 7 are compression seat-springs 12, 12, adapted to normally offset the lower ends of standards 9, 9 from buffers 7, 7, as best shown by the sectional view at the right side of Fig. 2.

This being a description of one embodiment of my present invention its operation is substantially as follows: Inequalities in a road-bed over which vehicles equipped with my improved shock absorber may be traveling naturally cause sudden compression of the vehicle springs 2, if this spring action be slight the occupants of seat 11 are cushioned upon springs 12 as the lower end of standards 9 approach the inner surfaces of buffers 7. If, however, the obstruction is greater, the compression of springs 2 being correspondingly increased, buffers 7, 7 are first engaged by the inner leaf of said springs 2 immediately over axle 1, thereby bodily lifting thimbles 6 and placing seat springs 12, or either of them, under additional tension for the purpose aforesaid.

Further than as above set forth the operation is quite obvious, and need not be herein dwelt upon, but it will be noted that various structural changes may be made and substituted for the arrangement shown without in the least departing from the spirit of my invention. For example, it is by no means necessary to their successful operation that thimbles 6, 6 should bisect the vehicle frame 4 as shown, since these would perform their intended functions equally well if interposed between said members, it being necessary only that said thimbles be arranged and adapted to be engaged by the axle 1, either directly or indirectly, when it rises with relation to the body of the vehicle as the result of encountering inequalities or obstructions in a road-bed. In other words, the spring equipment should be such that seat 11 does not rest directly upon the frame or body of the vehicle, but rather upon interposed seat-springs which afford freedom of movement in a vertical direction under ordinary road conditions, and are capable still further of compression when unusual obstructions are encountered with the effect of lessening or holding in check excessive vibrations. It will also be noted that the frame members 4, 4 may be of any cross sectional shape other than that shown.

Having thus described my invention, what I now claim and desire to secure by Letters Patent is:

1. In a vehicle the combination with a seat having a depending spring support, of means whereby said seat spring may be operatively engaged by the vehicle axle when meeting inequalities in the road-bed for momentarily imparting additional compression to said seat spring.

2. In a vehicle the combination with a seat having a depending spring support, of means whereby the lower extremity of said seat spring may be operatively engaged by the vehicle axle when meeting inequalities in the road-bed for momentarily imparting additional compression to said seat spring.

3. In a vehicle the combination with a seat having depending spring supports, of a telescoping tubular casing for said springs, and means whereby said casing may be driven together and their springs subjected to additional compression by momentary impact of the vehicle axle when inequalities of the road-bed are encountered.

4. In a vehicle the combination with a seat, of tubular standards depending from said seat, vertically movable tubular thimbles carried by the vehicle frame with which said standards are telescopically connected, compression springs within said tubular members, and means whereby said springs and thimbles may be operatively engaged by the vehicle axle when meeting inequalities in the road-bed.

5. In a vehicle the combination with a seat having depending spring supports, of a telescoping tubular casing for each of said seat springs, a closure for the lower extremity of said casing, and means whereby said casing members may be driven together and their springs subjected to additional compression by momentary impact of the vehicle axle when inequalities of the road-bed are encountered.

In testimony whereof I affix my signature, in presence of two subscribing witnesses.

ALEXANDER DECKER.

Witnesses:
P. F. HARTRANFT,
MARY E. HALES.

---

Copies of this patent may be obtained for five cents each, by addressing the "Commissioner of Patents, Washington, D. C."